(12) United States Patent
Inoko

(10) Patent No.: US 7,830,604 B2
(45) Date of Patent: Nov. 9, 2010

(54) PROJECTION LENS, IMAGE PROJECTION APPARATUS AND OPTICAL APPARATUS

(75) Inventor: Kazuhiro Inoko, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 130 days.

(21) Appl. No.: 12/147,626

(22) Filed: Jun. 27, 2008

(65) Prior Publication Data
US 2009/0009878 A1    Jan. 8, 2009

(30) Foreign Application Priority Data
Jul. 3, 2007    (JP)    ............... 2007-175065

(51) Int. Cl.
G02B 15/14    (2006.01)
(52) U.S. Cl. .................. 359/557; 359/683; 359/813
(58) Field of Classification Search .................. 359/557, 359/683, 813
See application file for complete search history.

(56) References Cited

U.S. PATENT DOCUMENTS

| | | | |
|---|---|---|---|
| 4,287,970 A * | 9/1981 | Eusemann et al. .......... | 188/269 |
| 5,583,694 A * | 12/1996 | Takahashi et al. ........... | 359/557 |
| 5,592,331 A | 1/1997 | Eastcott | |
| 5,617,159 A | 4/1997 | Sakagami et al. | |
| 5,986,806 A * | 11/1999 | Sugawara ................. | 359/557 |
| 6,880,937 B2 * | 4/2005 | Hayashi ................... | 359/557 |
| 7,265,917 B2 * | 9/2007 | Kugler et al. ............... | 359/813 |
| 7,586,682 B2 * | 9/2009 | Ohtake et al. .............. | 359/557 |
| 2003/0103266 A1 | 6/2003 | Wada | |
| 2007/0297074 A1 * | 12/2007 | Kugler et al. ............... | 359/813 |

FOREIGN PATENT DOCUMENTS

| JP | 02-035406 A | 2/1990 |
|---|---|---|
| JP | 2005-352407 A | 12/2005 |

OTHER PUBLICATIONS

European Patent Office Communication with partial European search report concerning application 08011507-2217.4, Sep. 23, 2008.
European Search Report issued on Jan. 29, 2009 for corresponding European Patent Application No. 08011507.4.

* cited by examiner

*Primary Examiner*—Evelyn A. Lester
(74) *Attorney, Agent, or Firm*—Canon U.S.A., Inc. IP Division

(57) ABSTRACT

The projection lens that projects a light flux from an object onto a projection surface. The projection lens includes a negative lens unit having a negative optical power, and a correction mechanism that tilts the negative lens unit with respect to an optical axis of the projection lens such that field tilt is generated in a direction opposite to a direction of field curvature generated at the projection surface. The projection lens reduces the generation of field curvature and its variation using a simple configuration.

9 Claims, 7 Drawing Sheets

PROJECTION LENS, IMAGE PROJECTION APPARATUS AND OPTICAL APPARATUS

BACKGROUND OF THE INVENTION

The present invention relates to a projection lens used in optical apparatuses such as an image projection apparatus.

A projection lens used in an image projection apparatus such as a projector requires a long back focus to avoid interference of the projection lens with a color separating/combining optical system. The projection lens for the projector therefore often adopts a so-called retrofocus type lens configuration including a stronger negative refractive power at a position closer to a screen than an aperture stop.

However, the retrofocus type lens is characterized in that, mainly from its asymmetry, field curvature is easily caused due to distance variations, in other words image quality is easily changed due to variation of its projection distance. Moreover, recently, because of the demand for shorter projection distances, the field angle of the projection lens is increased and thereby the characteristic described above becomes more notable. In addition to this, there is less tolerance for influences of variation of the field curvature due to the distance variation because of a higher resolution of an image-forming element such as a liquid-crystal panel.

There is a method called floating for reducing the variation of field curvature. With the floating method, plural lens units are simultaneously moved in an optical axis direction in focusing to mutually cancel field curvatures generated by the plural lens units. An example of using the floating method in a projection lens for projectors has been disclosed in Japanese Patent Laid-Open No. 2005-352407.

However, to implement the floating method disclosed in Japanese Patent Laid-Open No. 2005-352407, it is necessary to provide a complex mechanical configuration that includes not only a cam mechanism, but also a helicoid mechanism in the projection lens. For that reason, not only is the projection lens larger in size, but manufacturing variation easily occurs that invites performance variation of the projection lens.

BRIEF SUMMARY OF THE INVENTION

The present invention provides a projection lens that reduces the generation of field curvature and its variation using a simple configuration, and an image projection apparatus and an optical apparatus that are equipped with the same.

The present invention provides, according to one aspect thereof, a projection lens that projects a light flux from an object onto a projection surface. The projection lens includes a negative lens unit having a negative optical power, and a correction mechanism that tilts the negative lens unit with respect to an optical axis of the projection lens such that field tilt is generated in a direction opposite to a direction of field curvature generated at the projection surface.

The present invention provides, according to another aspect thereof, a projection lens that projects a light flux from an object onto a projection surface. The projection lens includes a negative lens unit having a negative optical power, and a correction mechanism that moves the negative lens unit in a direction of an optical axis of the projection lens and changes a tilt amount of the negative lens unit with respect to the optical axis.

The present invention provides, according to still another aspect thereof, an image projection apparatus including an image-forming element that forms an image, and the above-described projection lens that projects a light flux from the image-forming element onto a projection surface.

The present invention provides, according to still further another aspect thereof, an optical apparatus including the above-described projection lens that projects a light flux from an object onto an image-pickup element that is placed at a projection surface and performs photoelectric conversion.

Other aspects of the present invention will become apparent from the following description and the attached drawings.

DETAILED DESCRIPTION OF THE EMBODIMENTS

Exemplary embodiments of the present invention will hereinafter be described with reference to the accompanying drawings.

Figure 1:
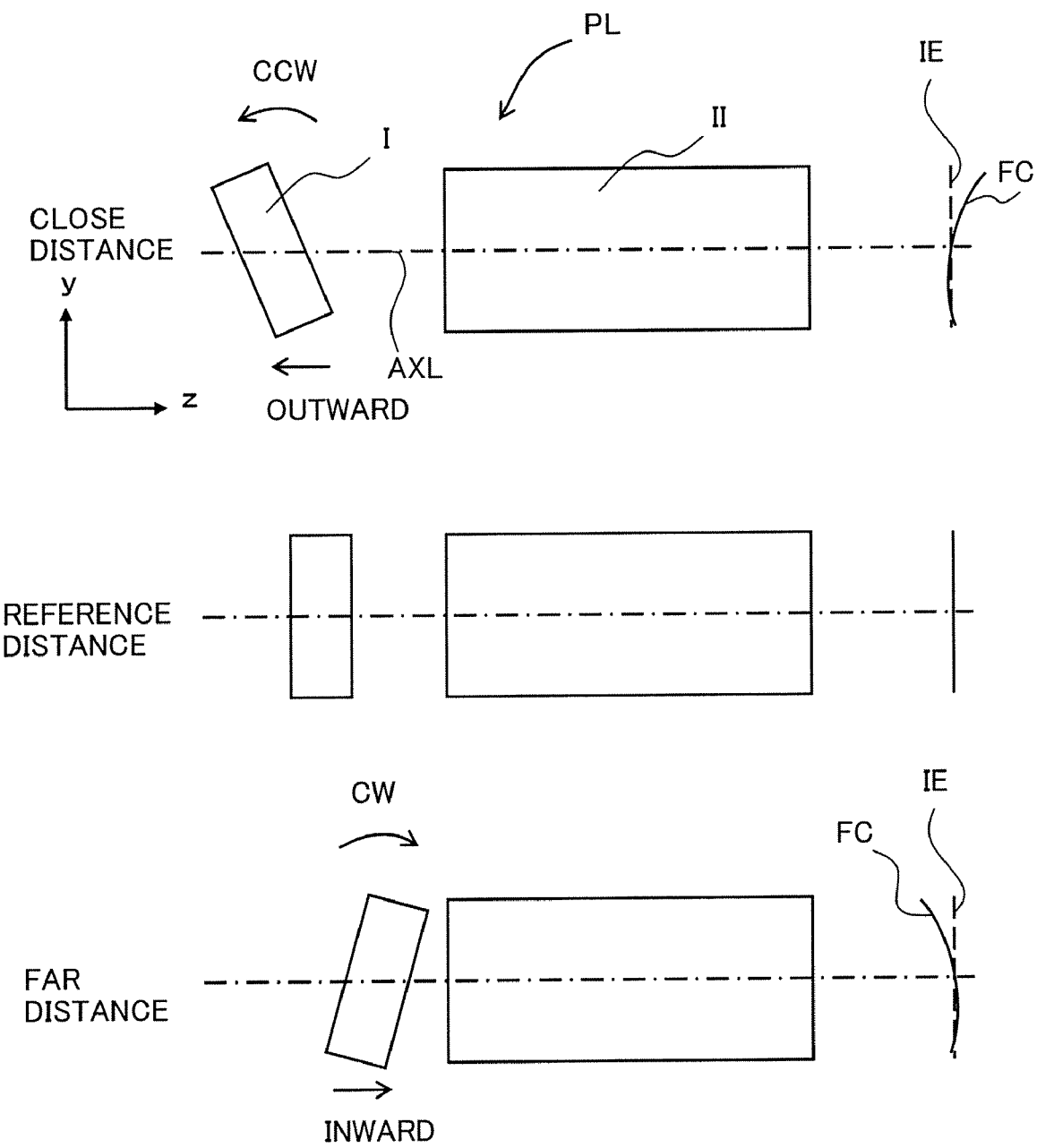
FIG. 1 is a schematic view showing the configuration of a projection lens that is an embodiment of the present invention.

FIG. 1 schematically shows a projection lens for projectors, which is an embodiment of the present invention. To simplify the explanation, the embodiment will be explained using a so-called inverse projection method in which light fluxes emitted from respective points on a projection surface such as a flat screen form images on an image-forming element such as a liquid-crystal panel through the projection lens.

Accordingly, in the following explanation, a screen side (a magnification side or a magnification conjugate side) is defined as an object side, and an image-forming element side (a reduction side or a reduction conjugate side) is defined as an image plane side. A surface formed by image formation of the light fluxes emitted from the respective points on the projection surface is referred to as an image plane. A surface where a flat image plane is to be formed under normal conditions is referred to as a predetermined image plane. The projection lens causes the image-forming element and the projection surface (screen) to have a conjugate relationship to form an image of the image-forming element on the projection surface.

Note that actually, the image-forming element side corresponds to an object side. The light fluxes emitted from the respective points on the image-forming element form the image plane on the projection surface (hereinafter referred to as the screen) that is the predetermined image plane. The screen side has the same meaning as that of the projection surface side.

In FIG. 1, reference character I denotes a first lens unit that is movable in an optical axis direction and constitutes a part of the projection lens PL. The first lens unit I is a negative lens unit (optical unit) having a negative refractive power (negative optical power). Reference character II denotes a second lens unit that constitutes another part of the projection lens PL and is disposed closer to the image plane (side) (actually disposed closer to the screen (side)) than the first lens unit I. The second lens unit II is constituted by at least one lens unit (more preferably, by plural lens units).

Reference character IE denotes an image-forming element such as a liquid-crystal panel that is disposed at the predetermined image plane. The image-forming element forms an original image corresponding to image signals from an image supply apparatus such as a personal computer, a DVD player or a television tuner, not shown. Reference character AXL denotes an optical axis of the projection lens PL.

The horizontal direction in the drawing is defined as a z-axis direction, and a direction from the left toward the right that is a direction of the inverse projection is defined as a positive direction in the z-axis direction. The vertical direction in the drawing is defined as a y-axis direction, and a direction from the bottom toward the top is a positive direction in the y-axis direction.

The projection lens PL of this embodiment in which the first lens unit I closest to the screen (disposed at the most screen side) having a negative refractive power is a retrofocus type projection lens. In this projection lens PL, focusing is performed by moving the first lens unit I in the optical axis direction. Specifically, when projecting an image onto a screen whose distance is shorter than a reference projection distance (shown as REFERENCE DISTANCE in the drawing), the first lens unit I is moved to the screen side (moved outward). When projecting an image onto a screen whose distance is longer than the reference projection distance, the first lens unit I is moved to the image-forming element side (moved inward).

Figure 3:
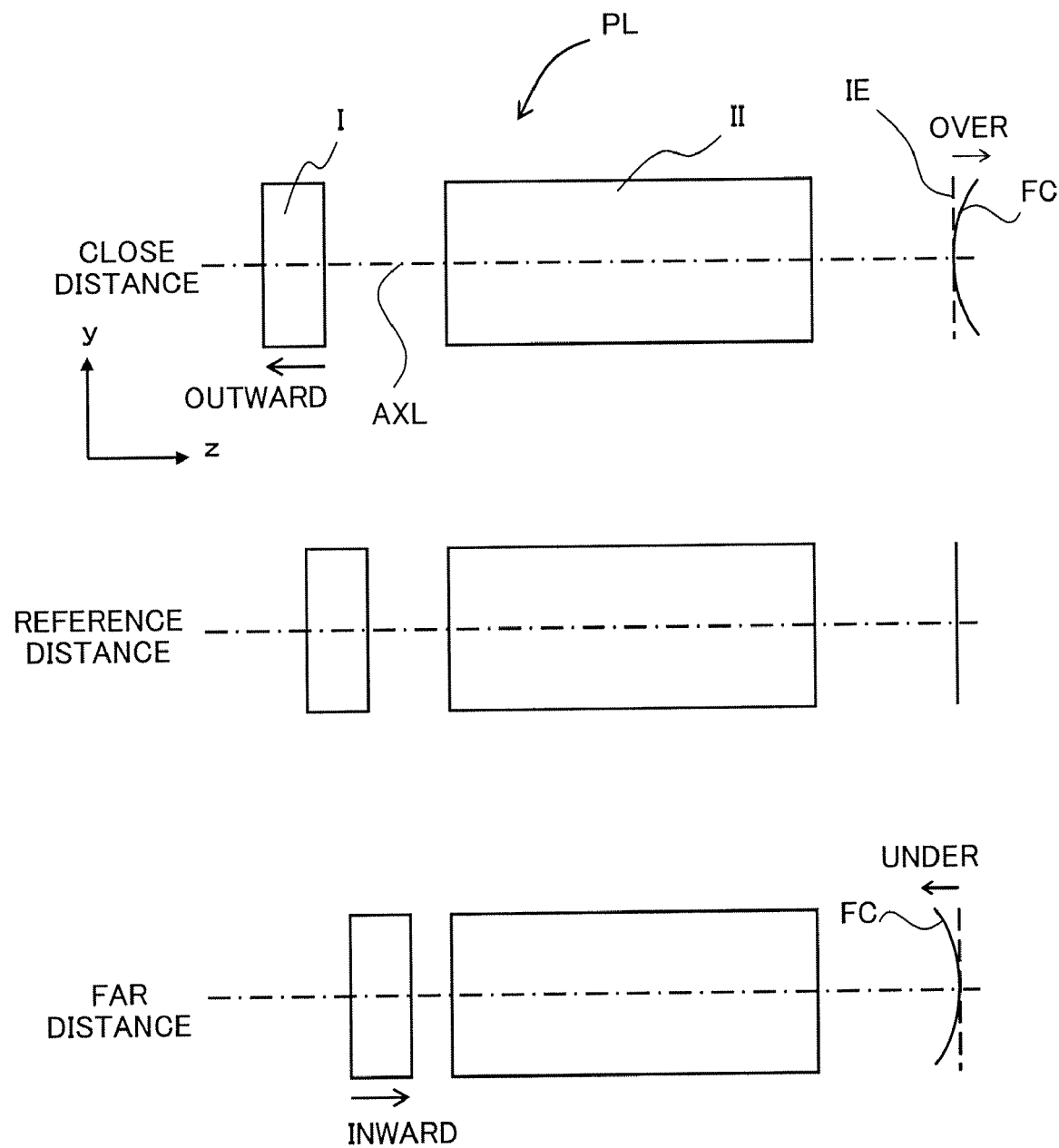
FIG. 3 is an explanatory view of focusing and variations of field curvature.

FIG. 3 shows this schematically. Also, FIG. 3 schematically shows field curvature FC generated in the focusing. When a peripheral part of the image plane in the direction orthogonal to the optical axis AXL is called merely a "peripheral image part", a shift of the peripheral image part to the positive (+) direction is referred to as "field curvature generated in an over direction", and a shift thereof to a negative (−) direction is referred to as "field curvature generated in an under direction".

In the retrofocus type projection lens of this embodiment, because of its asymmetry, the field curvature FC is generated in the over direction when the first lens unit I having a negative refractive power is moved outward, and the field curvature FC is generated in the under direction when the first lens unit I is moved inward. The first lens unit I is moved outward for focusing to a closer position to generate the field curvature in the over direction and moved inward for focusing to a farther position to generate the field curvature in the under direction.

Figure 4:
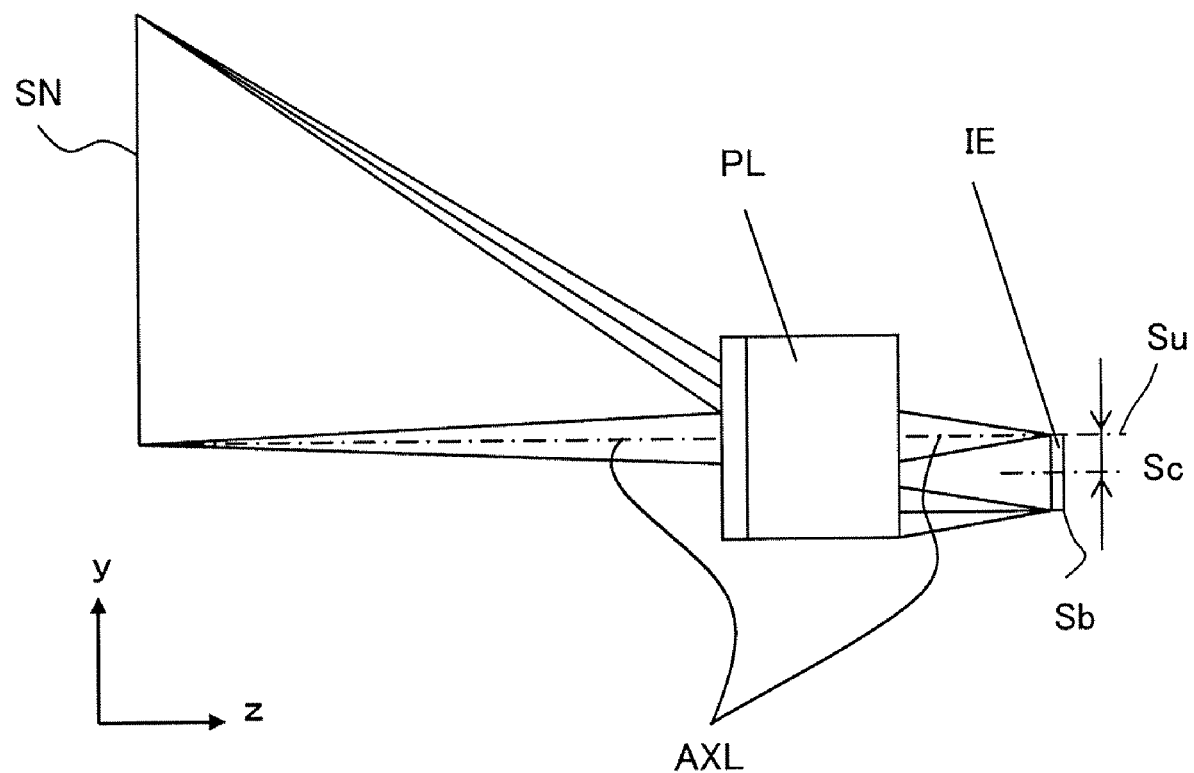
FIG. 4 is a schematic view showing the configuration of a projector including the projection lens of the embodiment.

As shown in FIG. 4, in the projector (image-projection apparatus) of this embodiment, the image-forming element IE is shifted downward by Sc with respect to the optical axis AXL of the projection lens PL. That is, a center coordinate of the image-forming element IE is y=−Sc. The y coordinates of an upper edge and a lower edge of the image-forming element IE (in other words, positions closest to and farthest from the optical axis AXL) on the image-forming elements IE in the direction orthogonal to the optical axis AXL) are denoted by Su and Sb, respectively.

In such a projector in which the image-forming element IE is shifted with respect to the optical axis AXL of the projection lens PL, the y coordinate Su is generally set so as to be y=0 or a coordinate close thereto, and the projector uses only approximately a lower half area of an effective image circle of the projection lens PL. Said another way using an ordinary expression, not with the inverse projection method, the projection lens PL projects a light flux from the image-forming element (object) IE located at one side (lower side) in the direction orthogonal to the optical axis AXL onto a screen SN located at another side (upper side) in that direction. In other words, the projection lens PL projects the light flux from the image-forming element IE located at the lower side with respect to the optical axis AXL onto the screen SN located at the upper side with respect to the optical axis AXL.

Figure 5:
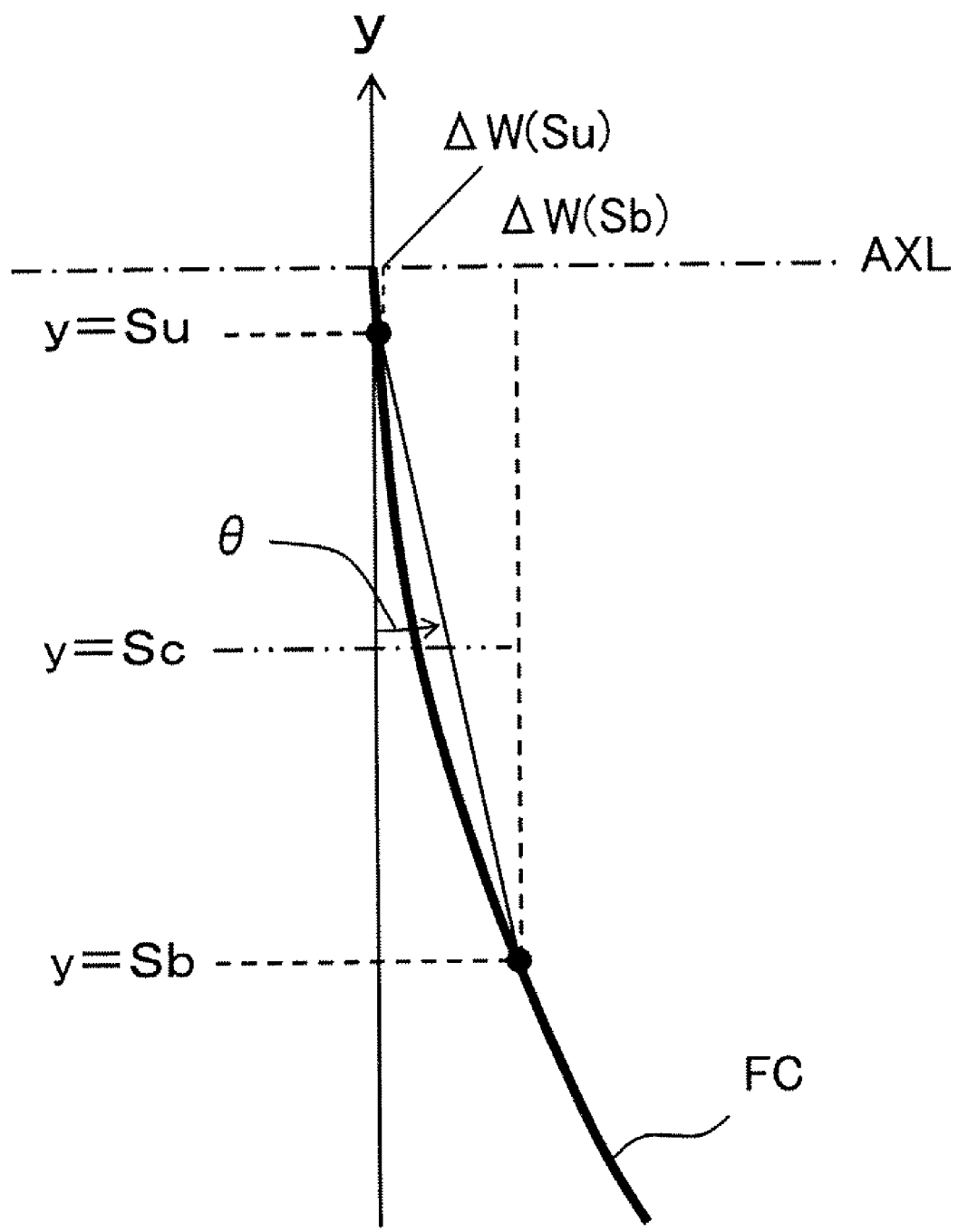
FIG. 5 is an enlarged view of the field curvature.

FIG. 5 schematically shows a state where the field curvature FC is generated on the image-forming element IE, in the inverse projection method.

In FIG. 5, the amount of the field curvature at an arbitrary y coordinate on the image plane is defined as $\Delta W(y)$. The over direction is shown by $\Delta W > 0$, and the under direction is shown by $\Delta W < 0$. A displacement amount between positions on the image plane that correspond to the upper edge (y=Su) and the lower edge (y=Sb) of the image-forming element IE is expressed as follows:

$$\Delta W(Sb) - \Delta W(Su).$$

Accordingly, a tilt amount (tilt angle) θ of the image plane between the positions on the image plane that correspond to the upper edge and lower edge of the image-forming element IE is calculated using the following expression:

$$\theta = \tan^{-1}[\{\Delta W(Sb) - \Delta W(Su)\}/(Su - Sb)].$$

A sign of the tilt amount θ of the image plane is positive in the over direction, and shown by an arrow in FIG. 5.

On the other hand, the projection lens PL of this embodiment causes the first lens unit I serving as a focusing lens to tilt with respect to the optical axis AXL (in other words with respect to the second lens unit II) to generate field tilt according to the tilt direction of the first lens unit I. The tilt direction of the first lens unit I is a direction in which the field tilt is generated (an image plane is tilted) in a direction opposite to that of the field curvature on the screen SN.

In this way, tilting the first lens unit I in a state, for example, where the field curvature is generated in the over direction as shown in FIG. 5 makes it possible to cause a straight line tilted by an angle of θ with respect to a y-axis to be parallel (includes a case that can be regarded as parallel) or near parallel to the y-axis. This makes it possible to cause an approximately flat object surface and an approximately flat image plane to have a substantially conjugate relationship even when the field curvature is generated, thereby enabling projection of an in-focus image onto the screen SN.

Figure 6:
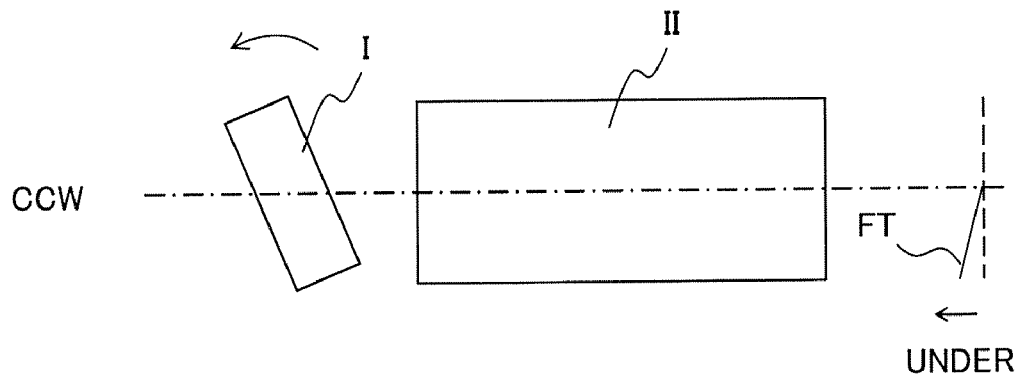
FIG. 6 is an explanatory view showing tilt of an image plane caused by tilting a first lens unit in the embodiment.
Figure 6:
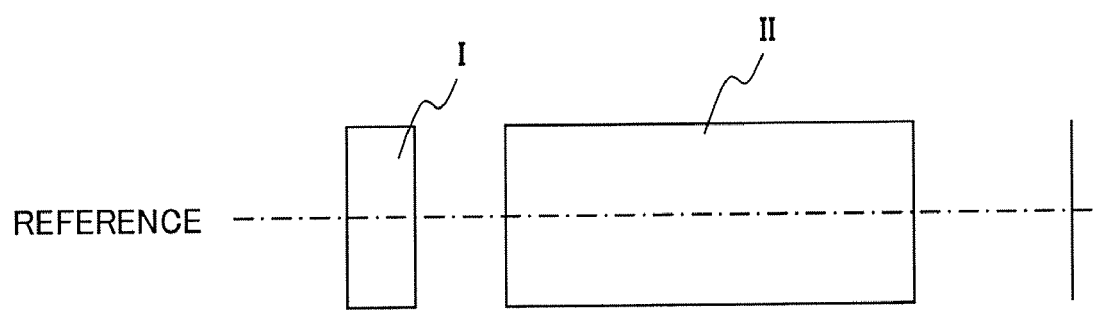
Figure 6:
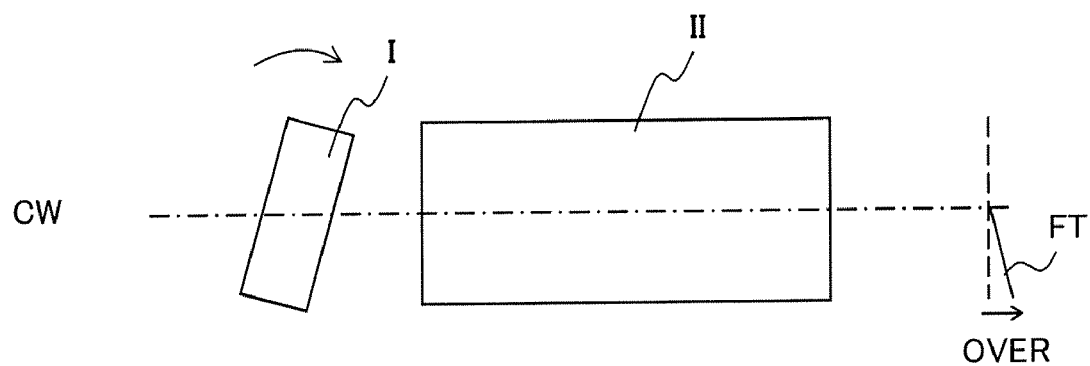

FIG. 6 schematically shows the field tilt generated by tilting the first lens unit I. While the field curvature FC is generated symmetrically with respect to the optical axis AXL in the vertical direction as shown in FIG. 3, the field tilt FT is generated asymmetrically in the vertical direction.

The explanation for the field tilt FT in this embodiment is related to the lower half area of the effective image circle which is used in actually image projection. A direction of rotation (tilt) shown with reference character CW in FIG. 6 is called a clockwise direction, and a direction of rotation shown with reference character CCW is called a counterclockwise direction. The rotation directions CW and CCW are defined for the case where the right side is the reduction conjugate side (image-forming element side) and the left side is the magnification conjugate side (projection surface side). Said another way, the rotation directions CW and CCW are directions when the lower half area of the effective image circle is used in a conjugate plane on the right side and an upper half area thereof is used in a conjugate plane of the left side. Therefore, if the left and right sides are reversed, the rotation directions CW and CCW are also reversed.

In the retrofocus type lens like the projection lens of this embodiment, the first lens unit I disposed closest to the screen (at the most-screen side) has a negative refractive power. Tilting the first lens unit I in the clockwise (CW) direction generates the field tilt FT in the over direction, and tilting it in the counterclockwise (CCW) direction generates the field tilt FT in the under direction.

Further, in a case where an angle (amount) of the field tilt generated when the first lens unit I is titled by a unit angle (unit amount) is defined as $\alpha$, a tilt amount D of the first lens unit I to correct the tilt amount $\theta$ of the image plane described above is expressed as:

$$D = A \cdot \theta / \alpha \qquad (1).$$

In the expression (1), the tilt amount D of the first lens unit I in the clockwise direction is a positive amount, and the angle $\alpha$ of the field tilt in the over direction is a positive angle, similarly to the tilt amount $\theta$ of the image plane. A represents an arbitrary fine adjustment coefficient and is a positive value for adequate fine adjustment depending on the shape of the field curvature for individual projection lenses. Actually, an adequate tilt amount D of the first lens unit I can be obtained by adjusting the coefficient A in the range of:

$$0.5 < A < 2.$$

In other words, it is preferred that the tilt amount D of the first lens unit I satisfy the following condition:

$$\theta / 2\alpha < D < 2\theta / \alpha \qquad (2).$$

Note that the condition (2) is preferred to be satisfied, but the condition (2) is not necessarily a condition that must be satisfied.

The direction of the field curvature is changed by the inward and outward movements of the first lens unit I from a position corresponding to the reference projection distance as described above. However, the amount of the field curvature is changed depending on the inward and outward movement amounts of the first lens unit I.

Therefore, this embodiment changes the tilt amount and the tilt direction of the first lens unit I with respect to the optical axis AXL depending on the position of the first lens unit I in the optical axis direction.

To implement such a tilting action of the first lens unit I, the embodiment employs a cam mechanism, for example.

Figure 2:
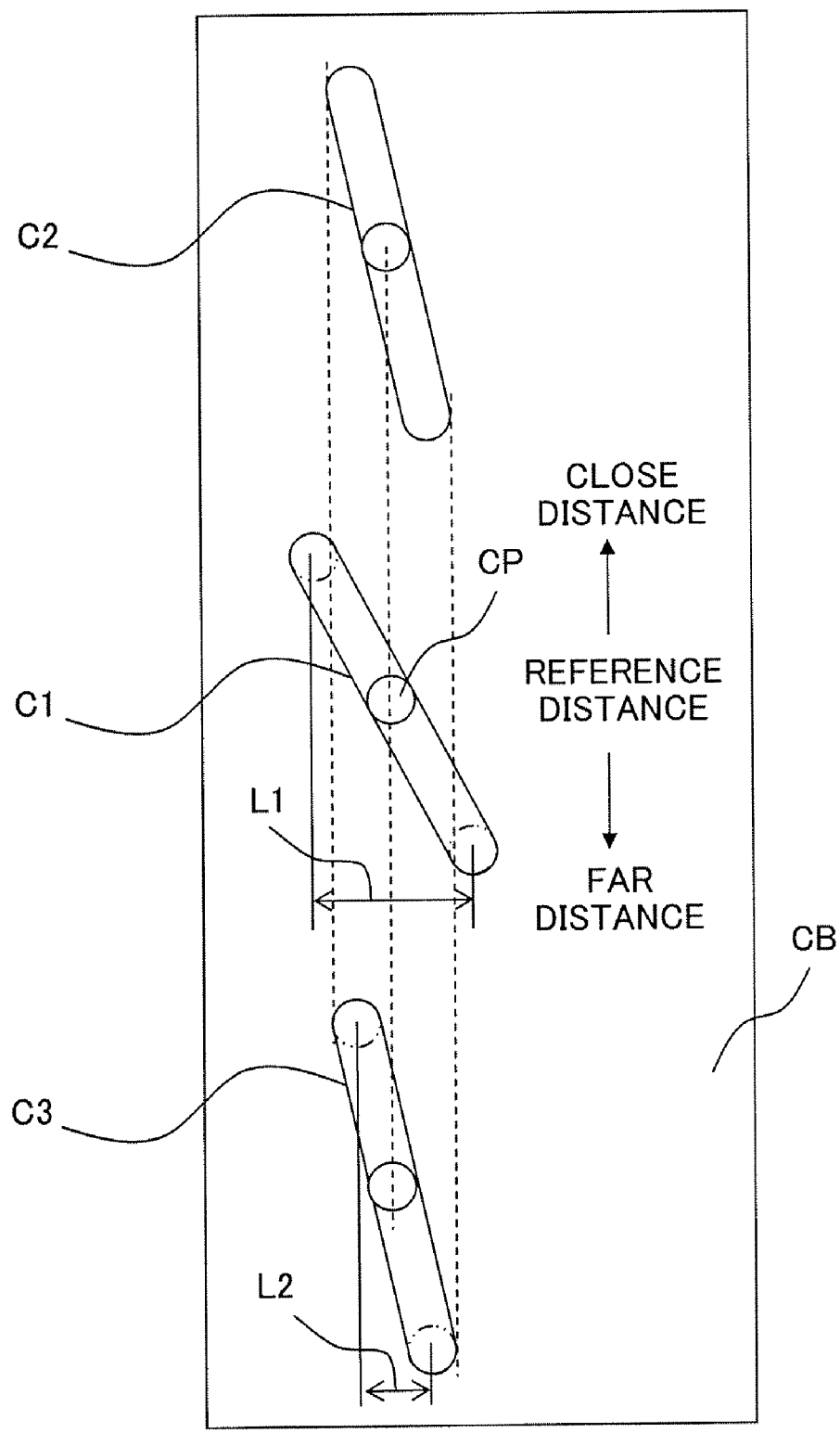
FIG. 2 is a development view showing the configuration of a cam mechanism in the embodiment.

FIG. 2 shows a cam barrel CB that constitutes a cam mechanism and is developed in a circumferential direction of the projection lens. Three cams (cam grooves) C1, C2, and C3 are formed at three locations on the cam barrel CB in its circumferential direction that corresponds to the top, lower right and lower left of the actual projection lens. Cam pins CP provided to a lens holding member, not shown, which holds the first lens unit I engage with the cams C1, C2, and C3.

In this embodiment, an inclination angle of the top cam C1 is set to be larger than those of the other cams C2 and C3. Therefore, an entire lift amount L1 in the optical axis direction obtained by the movement of the cam pin CP between both ends of the cam C1 is larger than an entire lift amount L2 obtained by the movement of the cam pins CP between both ends of the other cams C2 and C3. The entire lift amount can also be a movement amount of the cam pin CP in the optical axis direction when a focus state is changed from an infinity (farthest distance) in-focus state to a closest distance in-focus state (when the first lens unit I is moved). In further other words, this also is a length of the cam groove in the optical axis direction.

The inclination angles and entire lift amounts of the cams C2 and C3 are mutually the same.

The entire lift amount of one of the cams C1, C2, and C3 may be smaller than that of the other two cams.

This configuration can tilt the first lens unit I in the counterclockwise (CCW) direction when the first lens unit I is moved outward (when the projection lens is focused to a closer distance). This configuration also can tilt the first lens unit I in the clockwise (CW) direction when the first lens unit I is moved inward (when the projection lens is focused to a farther distance). The inclination angle of the cam C1 can be calculated using the above expression (1).

As described above, this embodiment sets the entire lift amount of at least one of the plural cams formed at the plural locations in the circumference direction of the first lens unit I to be different from the entire lift amounts of the other cams. This enables control of the tilt direction and tilt amount of the first lens unit I according to the position of the first lens unit I in the optical axis direction, that is, according to the projection distance, with a simple configuration. The number of the cams can be other than three.

FIG. 2 shows a case where each cam is formed as a straight cam. However, each cam may be formed as a nonlinear cam to enable fine adjustment of the tilt amount of the first lens unit I according to the inward and outward movement amounts thereof.

Figure 7A:
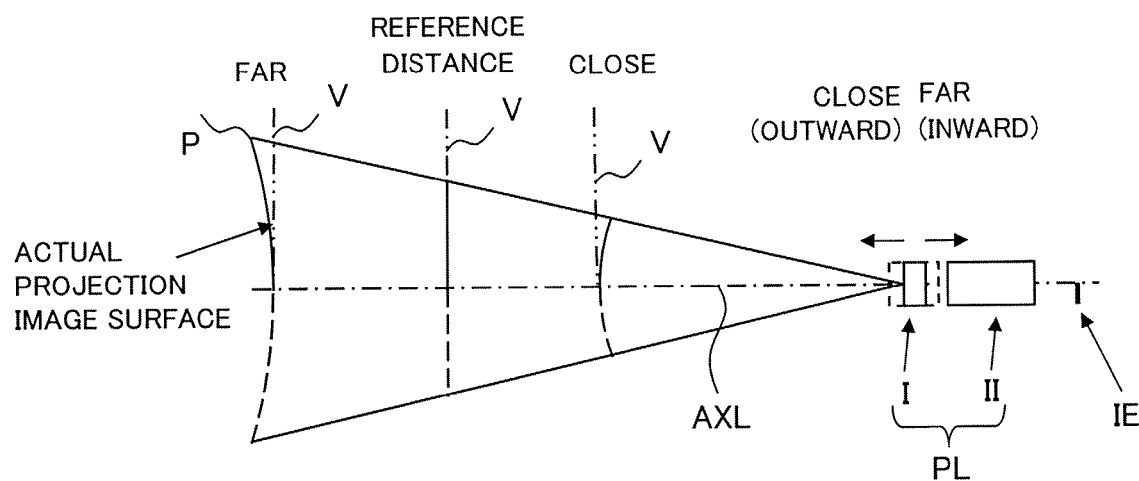
FIG. 7A shows field curvatures caused at projection surfaces whose distances are different from each other when there is no field curvature correction mechanism.
Figure 7B:
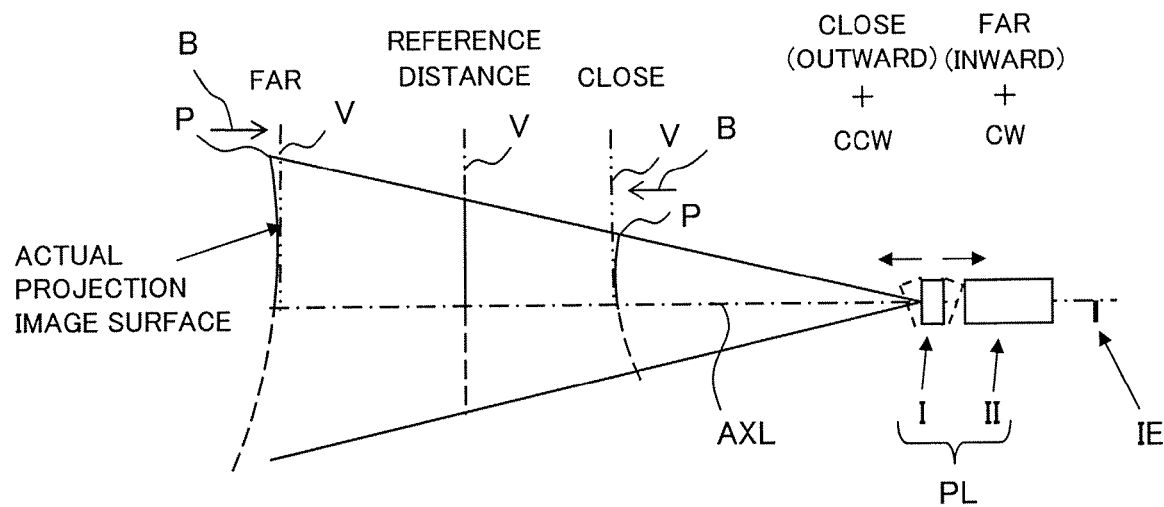
FIG. 7B shows field curvatures caused at projection surfaces whose distances are different from each other when there is a field curvature correction mechanism in the embodiment.

FIGS. 7A and 7B show a correction effect of the field curvature attained on an actual screen using the configuration described above. In these drawings, the same reference characters are applied to the elements identical to those shown in FIGS. 1 to 6.

In these drawings, reference character V denotes projection surfaces orthogonal to the optical axis AXL of the projection lens PL which are disposed at positions of different projection distances. FIG. 7A shows field curvature generated at each projection surface V when the projection lens PL does not use the correction mechanism for the field curvature (tilt mechanism for the first lens unit I) described in this embodiment. FIG. 7B shows field curvature generated at each projection surface V when the projection lens PL uses the correction mechanism.

As described above, the projection lens PL projects the light flux from the image-forming element IE located at the lower side with respect to the optical axis AXL onto the projection surface V located at the upper side with respect to the optical axis AXL. An image plane (actual projection image plane on which an actual projected image is formed) on the upper side with respect to the optical axis AXL is shown with a solid line, and an image plane, which is not actually formed, on the lower side with respect to the optical axis AXL is shown with a dotted line.

As can be understood by comparing these drawings, this embodiment can achieve a good correction effect for the field curvature shown in FIG. 7B by tilting the first lens unit I as described below, with respect to the optical axis AXL (the second lens unit II). This embodiment tilts the first lens unit I with respect to the optical axis AXL so that the field tilt is generated in a direction shown by an arrow B opposite to the direction of the field curvature at the projection surface V.

Further, this embodiment tilts the first lens unit I in a direction in which a part P of the actual projection image plane approaches a plane (projection surface V) orthogonal to the optical axis AXL, the part P being a part where the amount of the field curvature is largest in the actual projection image plane when the first lens unit I is not tilted with respect to the optical axis AXL. Compared to the case shown in FIG. 7A where the first lens unit I is not tilted, the width (amount) of the field curvature in the optical axis direction is smaller in the case shown in FIG. 7B where the first lens unit I is tilted.

This can reduce deterioration in image quality such as defocusing caused by the field curvature, by using the field tilt generated by tilting the first lens unit I (without correcting the field curvature). Therefore, the projection lens (and the projector) of this embodiment can project images with reducing image quality deterioration caused due to the field curvature and image quality variation due to change of the projection distance.

As described above, the projection lens of the present embodiment includes a negative lens unit that has a negative refractive power and is constituted by at least one lens, the negative lens unit being disposed closest to the projection surface (disposed at the most projection surface side, most screen side or most magnification side). Further, when the focusing (adjusting the focal length) is performed, the negative lens unit is moved in the optical axis direction. To reduce deterioration of image quality such as defocusing caused by variation of aberrations (mainly variation of field curvature) generated during the focusing, the negative lens unit is moved in the optical axis direction and the tilt of the negative lens unit with respect to the optical axis is changed. Specifically, the tilt of the negative lens unit is changed in a direction that can reduce negative influences caused by the variation of aberrations.

Therefore, when focusing from a far distance side to a close distance side is performed, it is preferred that the tilt angle of the negative lens unit with respect to the optical axis (or a plane orthogonal to the optical axis) be gradually changed in one direction. Furthermore, it is also preferred that the tilt direction of the negative lens unit with respect to the optical axis in the farthest distance in-focus state be opposite to that in the closest distance in-focus state. It is also acceptable that only the tilt angle of the negative lens unit is changed in the same tilt direction.

According to the embodiment, the projection lens is realized which can reduce variation of image quality associated with variations of the field curvature and projection distance with a simple configuration that causes the negative lens unit to tilt independently. Therefore, an image projection apparatus is realized which can project good quality images regardless of the projection distance.

Furthermore, the present invention is not limited to the embodiment and various variations and modifications may be made without departing from the scope of the present invention.

For example, the above embodiment described the case where the projection lens is shifted upward with respect to the image-forming element. However, it is also possible to project good quality images using the same field curvature correction method when the projection lens is shifted downward, leftward or rightward with respect to the image-forming element.

Moreover, the above embodiment described the case where the projection lens is shifted upward and fixed with respect to the image-forming element. However if dynamic correction in accordance with the condition (2) described above is performed, a field curvature correction method similar to that in the above embodiment can be used for a projector in which a projection lens is movable to be shifted with respected to the image-forming element.

Further, the above embodiment described the case where the negative lens unit closest to the screen in the retrofocus type projection lens is tilted. However, a lens unit to be tilted may be a negative lens unit disposed at a position other than that closest to the screen.

Furthermore, the above embodiment described a projector. However, if an image-pickup element that photoelectrically converts a light flux from a subject (object) is placed at a predetermined image plane instead of the image-forming element, a field curvature correction effect similar to that described in the above embodiment can be obtained in optical apparatuses other than the projector, such as an image-pickup apparatus (camera) and an interchangeable lens. The image-pickup element includes a CCD sensor and a CMOS sensor.

This application claims the benefit of Japanese Patent Application No. 2007-175065, filed on Jul. 3, 2007, which is hereby incorporated by reference herein in its entirety.

What is claimed is:

1. A projection lens configured to project a light flux from an object onto a projection surface, comprising:
   a negative lens unit having a negative optical power; and
   a correction mechanism configured to tilt the negative lens unit with respect to an optical axis of the projection lens such that a field tilt is generated in a direction opposite to a direction of a field curvature generated at the projection surface,
   wherein the projection lens projects the light flux from the object located at one side in a direction orthogonal to the optical axis onto the projection surface located at another side in that direction, and
   wherein the correction mechanism tilts the negative lens unit in a direction in which a part of an image plane formed by the projection lens approaches a plane orthogonal to the optical axis, the part of the image plane being a part where an amount of the field curvature is largest when the negative lens unit is not tilted with respect to the optical axis.

2. A projection lens according to claim 1, wherein a tilt amount D of the negative lens unit satisfies the following condition:

$$\theta/2\alpha < D < 2\theta/\alpha$$

where $\theta$ represents a tilt amount of the image plane formed by the projection lens and is defined as $\theta = \tan^{-1}[\{\Delta W(Sb) - \Delta W(Su)\}/(Su - Sb)]$; where
Su and Sb respectively represent positions in the object closest to and farthest from the optical axis in the direction orthogonal to the optical axis;
$\Delta W(Su)$ and $\Delta W(Sb)$ respectively represent amounts of the field curvature at positions on the image plane corresponding to the positions Su and Sb; and
$\alpha$ represents an amount of the field tilt generated when the negative lens unit is tilted by a unit amount.

3. A projection lens according to claim 1, wherein
the correction mechanism includes plural cams formed at plural locations thereof in a circumference direction of the negative lens unit, and
an entire lift amount of at least one of the plural cams is different from those of the other cams.

4. An image projection apparatus comprising:
an image-forming element that forms an image; and
a projection lens according to claim 1 that projects the light flux from the image-forming element onto the projection surface.

5. An optical apparatus comprising:
a projection lens according to claim 1 configured to project the light flux from the object onto an image-pickup element that is placed at the projection surface,
wherein the image-pickup element performs photoelectric conversion.

6. A projection lens configured to project a light flux from an object onto a projection surface, comprising:
a negative lens unit configured to have a negative optical power; and
a correction mechanism configured to tilt the negative lens unit with respect to an optical axis of the projection lens such that field tilt is generated in a direction opposite to a direction of field curvature generated at the projection surface,
wherein the projection lens is configured to project the light flux from the object located at one side in a direction orthogonal to the optical axis onto the projection surface located at another side in that direction, and
wherein a tilt amount D of the negative lens unit satisfies the following condition:

$$\theta/2\alpha < D < 2\theta/\alpha$$

where $\theta$ represents a tilt amount of an image plane formed by the projection lens and is defined as $\theta = \tan^{-1}[\{\Delta W(Sb) - \Delta W(Su)\}/(Su-Sb)]$;
Su and Sb respectively represent positions in the object closest to and farthest from the optical axis in the direction orthogonal to the optical axis;
$\Delta W(Su)$ and $\Delta W(Sb)$ respectively represent amounts of the field curvature at positions on the image plane corresponding to the positions Su and Sb; and
$\alpha$ represents an amount of the field tilt generated when the negative lens unit is tilted by a unit amount.

7. An image projection apparatus comprising:
an image-forming element configured to form an image; and
a projection lens according to claim 6 configured to project a light flux from the image-forming element onto a projection surface.

8. A projection lens configured to project a light flux from an object onto a projection surface, comprising:
a negative lens unit configured to have a negative optical power; and
a correction mechanism configured to tilt the negative lens unit with respect to an optical axis of the projection lens such that field tilt is generated in a direction opposite to a direction of field curvature generated at the projection surface,
wherein the correction mechanism is configured to include plural cams formed at plural locations thereof in a circumference direction of the negative lens unit, and
wherein an entire lift amount of at least one of the plural cams is different from those of the other cams.

9. An image projection apparatus comprising:
an image-forming element configured to form an image; and
a projection lens according to claim 8 configured to project a light flux from the image-forming element onto a projection surface.

* * * * *